(12) United States Patent
Dickson

(10) Patent No.: US 11,316,179 B2
(45) Date of Patent: Apr. 26, 2022

(54) METHOD FOR PRODUCING A COMPOSITE OF A BIPOLAR PLATE AND A MEMBRANE ELECTRODE ASSEMBLY WITH THE AID OF A MAGNETIC FIXING

(71) Applicants: AUDI AG, Ingolstadt (DE); VOLKSWAGEN AG, Wolfsburg (DE)

(72) Inventor: Brian Walter Dickson, Burnaby (CA)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 120 days.

(21) Appl. No.: 16/644,621

(22) PCT Filed: Jun. 20, 2018

(86) PCT No.: PCT/EP2018/066358
§ 371 (c)(1),
(2) Date: Mar. 5, 2020

(87) PCT Pub. No.: WO2019/048101
PCT Pub. Date: Mar. 14, 2019

(65) Prior Publication Data
US 2021/0083304 A1 Mar. 18, 2021

(30) Foreign Application Priority Data
Sep. 5, 2017 (DE) ..................... 10 2017 215 507.8

(51) Int. Cl.
*H01M 8/02* (2016.01)
*H01M 8/0284* (2016.01)
(Continued)

(52) U.S. Cl.
CPC ....... *H01M 8/0284* (2013.01); *H01M 8/0206* (2013.01); *H01M 8/0267* (2013.01); *H01M 8/0286* (2013.01); *H01M 8/1004* (2013.01)

(58) Field of Classification Search
CPC ............. H01M 8/0284; H01M 8/0206; H01M 8/0267; H01M 8/0286; H01M 8/1004
See application file for complete search history.

(56) References Cited

U.S. PATENT DOCUMENTS

2009/0004542 A1    1/2009  Budinski
2010/0024957 A1    2/2010  Puffer et al.

FOREIGN PATENT DOCUMENTS

DE         101 60 905 A1    7/2003
DE    11 2004 002 350 B4    9/2009
(Continued)

*Primary Examiner* — Olatunji A Godo
(74) *Attorney, Agent, or Firm* — Seed IP Law Group LLP

(57) ABSTRACT

In order to provide a method for producing a composite of a bipolar plate and an MEA, the following is proposed: arranging the bipolar plate in a tool, which has a ferromagnetic or magnetic element, which partially forms the contact surface for the bipolar plate and is designed to be removable from the tool, arranging a membrane electrode assembly on the bipolar plate, arranging a second ferromagnetic or magnetic element on the membrane electrode assembly, removing the membrane electrode assembly and bipolar plate fixed to one another by the two ferromagnetic or magnetic elements, inserting the bipolar plate fixed to the membrane electrode assembly into a second tool, injecting a melt of a polymeric sealing material into the at least one mold cavity of the tool, allowing the melt to solidify, and demolding and removing the composite or the composites. In addition, a composite and a fuel cell stack are disclosed.

11 Claims, 5 Drawing Sheets

(51) Int. Cl.
*H01M 8/0206* (2016.01)
*H01M 8/0267* (2016.01)
*H01M 8/0286* (2016.01)
*H01M 8/1004* (2016.01)

(56) References Cited

FOREIGN PATENT DOCUMENTS

| | | |
|---|---|---|
| DE | 10 2009 039 901 A1 | 3/2011 |
| DE | 10 2013 004 473 A1 | 9/2014 |
| JP | 2007-242532 A | 9/2007 |
| JP | 2009-252627 A | 10/2009 |
| KR | 10-2012-0115637 A | 10/2012 |
| WO | 03/063280 A2 | 7/2003 |

METHOD FOR PRODUCING A COMPOSITE OF A BIPOLAR PLATE AND A MEMBRANE ELECTRODE ASSEMBLY WITH THE AID OF A MAGNETIC FIXING

BACKGROUND

Technical Field

Embodiments of the invention relate to a method for producing a composite of a bipolar plate and a membrane electrode assembly for a fuel cell or a fuel cell stack, wherein the bipolar plate comprises two opposite plates and each plate has a cell side and a cooling side, a composite that can be produced according to the aforementioned method, and a fuel cell stack.

Description of the Related Art

Fuel cells use the chemical conversion of a fuel with oxygen into water in order to generate electrical energy. For this purpose, fuel cells contain as core component the so-called membrane electrode assembly (MEA), which is a composite of an ion-conducting, in particular a proton-conducting, membrane and an electrode (anode and cathode) arranged on each side of the membrane. Additionally, gas diffusion layers (GDL) may be arranged on both sides of the membrane electrode assembly on the sides of the electrodes facing away from the membrane. Usually, the fuel cell is formed by a plurality of MEAs arranged in a stack whose electrical power adds up. During operation of the fuel cell, the fuel, in particular hydrogen $H_2$ or a gas mixture containing hydrogen, is guided to the anode where an electrochemical oxidation of $H_2$ to $H^+$ with loss of electrons takes place. A (water-bound or water-free) transport of the $H^+$ protons from the anode chamber into the cathode chamber is effected via the electrolyte or the membrane, which separates the reaction chambers from each other in a gas-tight manner and electrically insulates them. The electrons provided at the anode are guided to the cathode via an electrical line. The cathode receives oxygen or a gas mixture containing oxygen so that a reduction of $O_2$ to $O^{2-}$ with gain of electrons takes place. At the same time, those oxygen anions react in the cathode chamber with the protons transported via the membrane while forming water. As a result of the direct conversion of chemical into electrical energy, fuel cells have improved efficiency compared to other electricity generators because the Carnot factor is avoided.

The fuel cell is formed by a plurality of individual cells arranged in the stack, which is why, as already discussed, this is also called a fuel cell stack. Between the membrane electrode assemblies are arranged bipolar plates, which ensure that the individual cells are supplied the operating media, i.e., the reactants and a coolant. In addition, the bipolar plates ensure an electrically conductive contact to the membrane electrode assemblies.

Seals are arranged between the membrane electrode assemblies and the bipolar plates, said seals sealing the anode and cathode chambers toward the outside and preventing the operating media from escaping from the fuel cell. The seals can be provided on the part of the membrane electrode assemblies or of the bipolar plates and in particular be connected to these components.

JP 2009252627 A describes a separator plate with a seal and a method for the production thereof. The separator plate is arranged in an injection molding tool and clamped by the tool, a seal being injection-molded onto the separator plate in the edge region.

DE 101 60 905 A1 discloses a composite of two separator plates with an MEA arranged therebetween. The MEA is recessed with respect to the ends of the separator plates so that there is a gap between them in the edge region. On the one hand, a seal surrounds the arrangement and is additionally introduced into the gap between the separator plates.

DE 11 2004 002 350 B4 relates to a method for producing a fuel cell in which an MEA is stamped out by means of a holding element holding a bipolar plate and is deposited directly with the bipolar plate on a fuel cell stack. The holding element is designed as a suction cushion or magnetic chuck.

BRIEF SUMMARY

Embodiments of the invention are based on the object of providing a method for producing a composite of a bipolar plate and an MEA and a composite with which an error rate in arranging or aligning the individual components of the composite is reduced.

This object is achieved by a method described herein and by a composite described herein.

A method for producing a composite of a bipolar plate and a membrane electrode assembly (MEA) for a fuel cell or a fuel cell stack, wherein the bipolar plate has a pair of opposite plates and each plate has a cell side and a cooling side, may comprise:

a) arranging the bipolar plate in a tool which has a ferromagnetic or magnetic element which partially forms the contact surface for the bipolar plate and is designed to be removable from the tool, b) arranging a membrane electrode assembly on the side of the bipolar plate opposite the contact surface of the tool, c) arranging a second ferromagnetic or magnetic element which is designed to correspond to the first ferromagnetic or magnetic element in order to be able to exert a magnetic attraction on one another, on the membrane electrode assembly such that both ferromagnetic or magnetic elements are at least partially congruent, d) removing membrane electrode assembly and bipolar plate fixed to one another by the two ferromagnetic or magnetic elements, e) inserting membrane electrode assembly and bipolar plate fixed to one another by the two ferromagnetic or magnetic elements into a second tool which, in the closed state, has at least one mold cavity on one side or on both sides of the edge region of the bipolar plate and a second chamber for receiving the two magnetic or ferromagnetic elements, the mold cavity and the second chamber being separated from one another, f) injecting a melt of a polymeric sealing material into the mold cavity of the injection molding tool, g) allowing the melt to solidify, h) demolding and removing the composite formed in f), and i) optionally removing the two magnetic or ferromagnetic elements.

For positioning the bipolar plate, the tool in step a) may have a stop onto which the bipolar plate is placed with its edge region so that a positioning process can be carried out in a time-saving manner.

The contact surface of the tool may be planar in order to be able to support the bipolar plate without stress.

In addition, the tool may be designed such that the ferromagnetic or magnetic element can be removed orthogonally to the contact surface.

In step c), the second ferromagnetic or magnetic element may be arranged congruently on the first ferromagnetic or magnetic element.

The second tool in step e) may be an injection molding tool.

Apart from the ferromagnetic or magnetic elements temporarily located therein, the first and the second tool may consist of a non-ferromagnetic or non-magnetic material in order to avoid undesired interactions with the two ferromagnetic or magnetic elements.

If an element is embodied as magnetic, it can be designed as a permanent magnet or as an electromagnet.

The bipolar plate used according to the method has a peripheral edge region which has a likewise peripheral depression so that the edge region adjacent to the depression has two elevated partial regions opposite the depression.

A seal which may be integrated into the sealing material when said material is sprayed on can be arranged at the edge of the edge region and thus adjacent to the depression.

The same is true for the MEA, which covers but also extends beyond the active region of the bipolar plate. In this case, it rests on the partial region of the edge region adjacent to the active region and projects freely over part of the depression. When the sealing material is sprayed on, the edge of the MEA is therefore integrated into the resulting seal so that during the further processing of the composite obtained, there is reduced risk of the MEA slipping relative to the bipolar plate and possibly being damaged as a result.

The polymer(s) that can be used for both seals, in particular a thermoplastic, an elastomer or a thermoplastic elastomer, are basically known to the person skilled in the art.

Embodiments of the invention further relate to a composite produced according to the methods described herein and to a fuel cell stack comprising composites produced according to the methods described herein.

The statements made above regarding the method also apply analogously to the composite and vice versa.

Aspects and features of the various embodiments described herein may be combined with each other unless stated otherwise in individual cases.

BRIEF DESCRIPTION OF THE SEVERAL VIEWS OF THE DRAWINGS

Embodiments of the invention are explained below in reference to the respective drawings. The following is shown.

DETAILED DESCRIPTION

Figure 1:
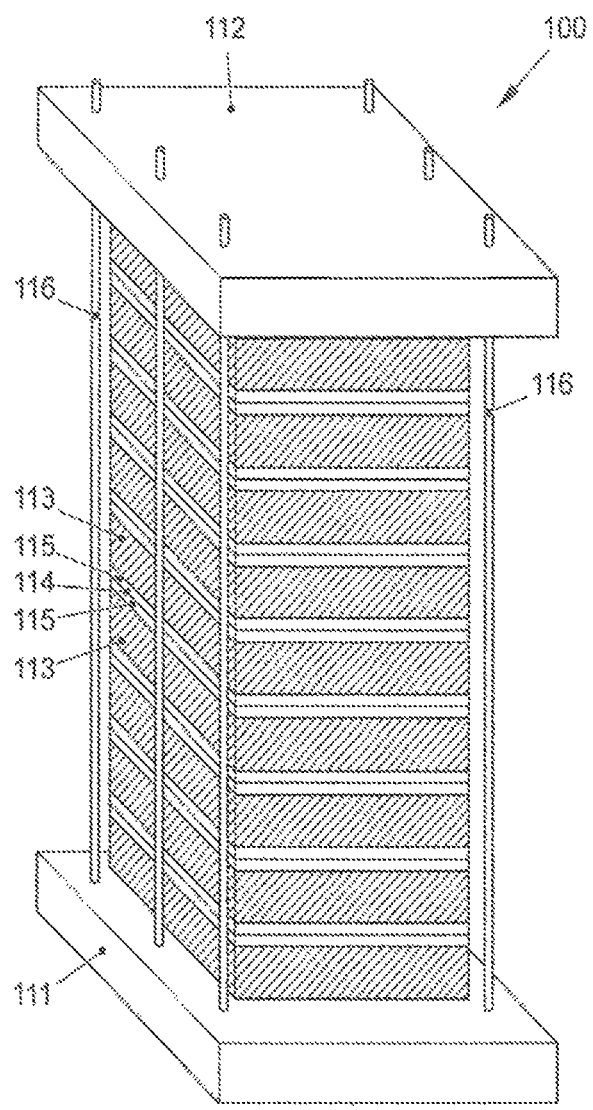
FIG. 1 is a schematic representation of a fuel cell stack according to the prior art.

FIG. 1 shows, in a highly schematic representation, a fuel cell stack 100 according to the prior art. The fuel cell stack 100 comprises two end plates 111, 112 between which a plurality of stack elements stacked one on top the other is arranged, which comprise bipolar plates 113 and membrane electrode assemblies 114. The bipolar plates 113 are stacked alternately with the membrane electrode assemblies 114. The membrane electrode assemblies 114 each comprise a membrane and adjacent electrodes on both sides of the membrane, namely an anode and a cathode (not depicted). The membrane electrode assemblies 114 also have gas diffusion layers (also not depicted) abutting the membrane. Arranged between each of the bipolar plates 113 and membrane electrode assemblies 114 are respective sealing elements 115 that seal off the anode and cathode chambers in a gas-tight manner from the outside. Between the end plates 111 and 112, the fuel cell stack 100 is pressed in by means of clamping or tension elements 116. In FIG. 1, only the narrow sides of the bipolar plates 113 and the membrane electrode assemblies 114 are visible. The main sides of the bipolar plates 113 and the membrane electrode assemblies 114 abut one another. The representation in FIG. 1 is not dimensionally accurate. In addition, the number of individual cells is usually much greater than shown. FIG. 1 merely serves to illustrate the basic structure of a fuel cell stack 100 made of various elements, as it is also relevant for the elements produced as described herein.

Figure 2:
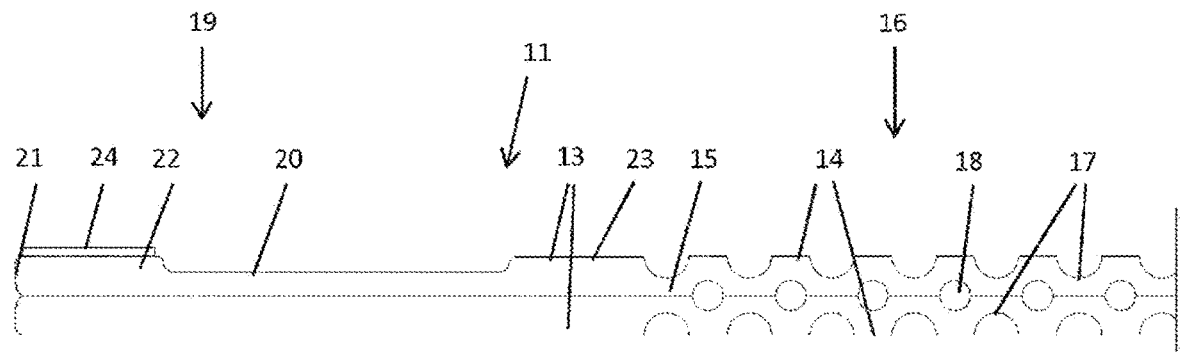
FIG. 2 is a laterally cut partial view of a bipolar plate made of two plates with a seal arranged on one of the plates in the edge region.
Figure 3:
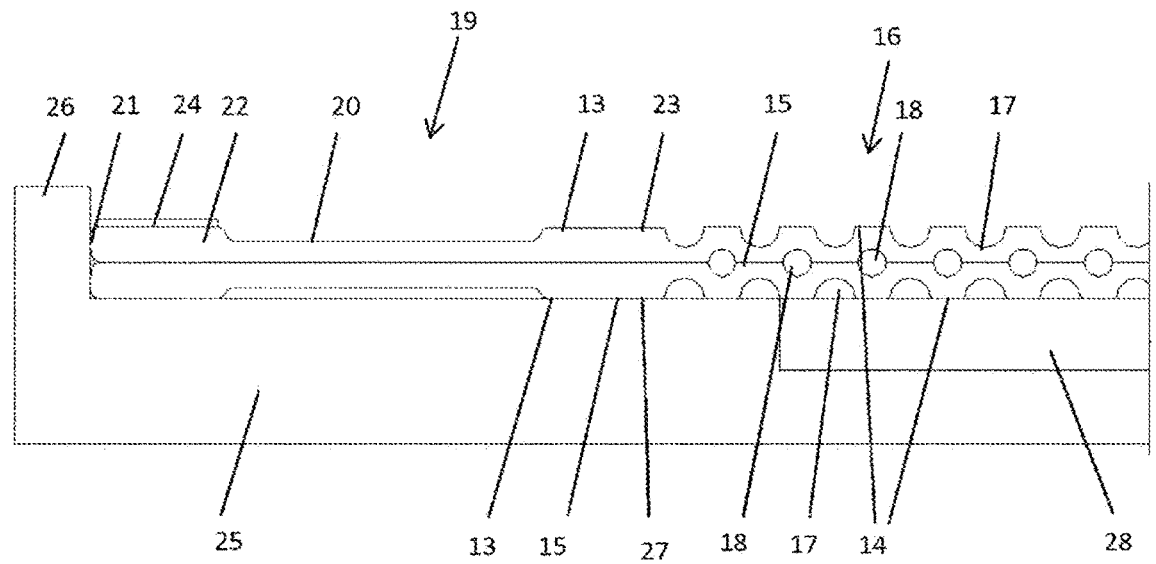
FIG. 3 is a laterally cut partial view of the bipolar plate in a tool with a ferromagnetic element.
Figure 4:
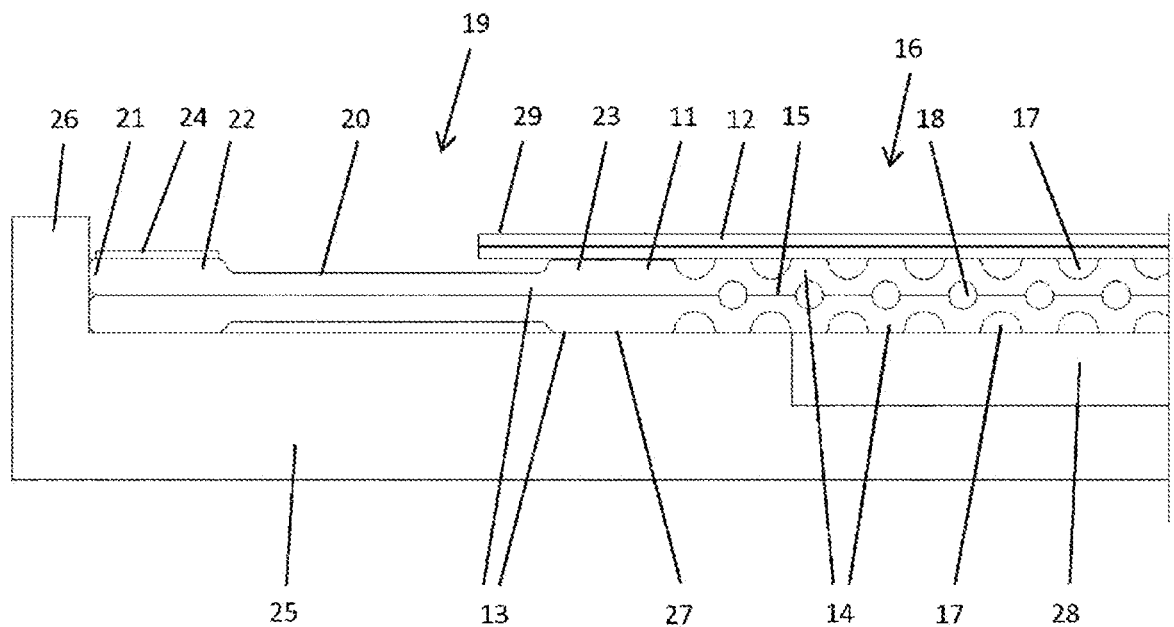
FIG. 4 is a laterally cut partial view of the bipolar plate in the tool and an MEA arranged on the bipolar plate.
Figure 5:
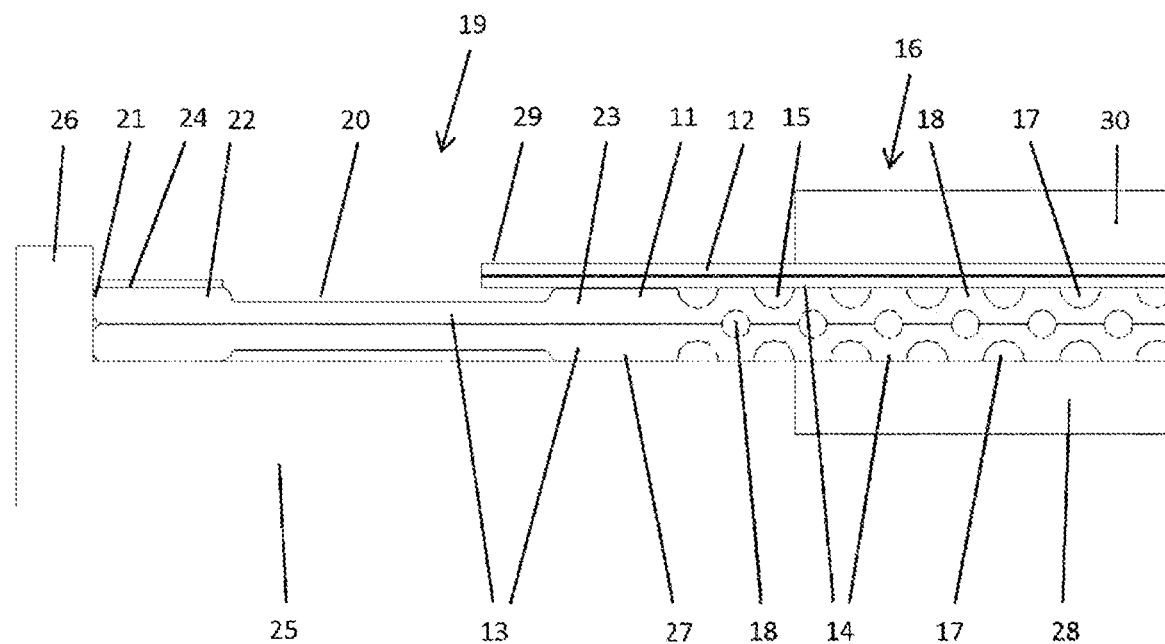
FIG. 5 is a laterally cut partial view of the bipolar plate with MEA arranged thereon and a magnetic fixing element arranged on the MEA.
Figure 6:
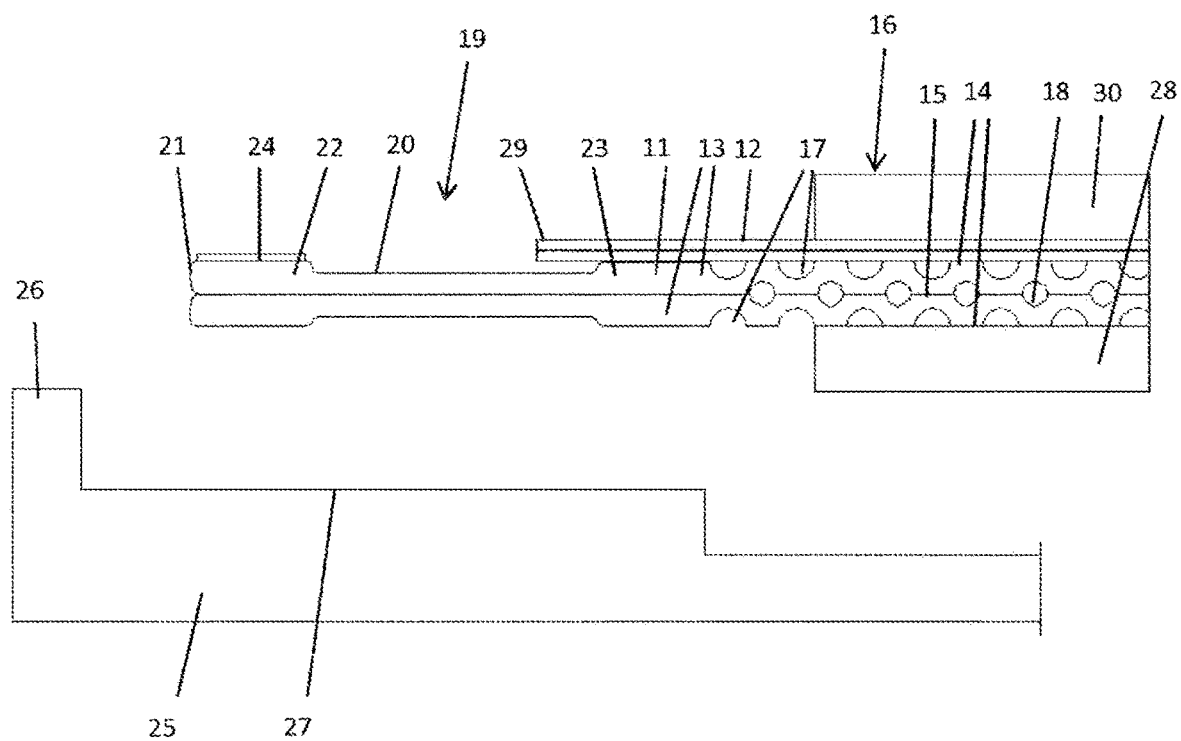
FIG. 6 is a laterally cut partial view of the removal of the bipolar plate with the MEA and the fixing elements as a unit.
Figure 7:
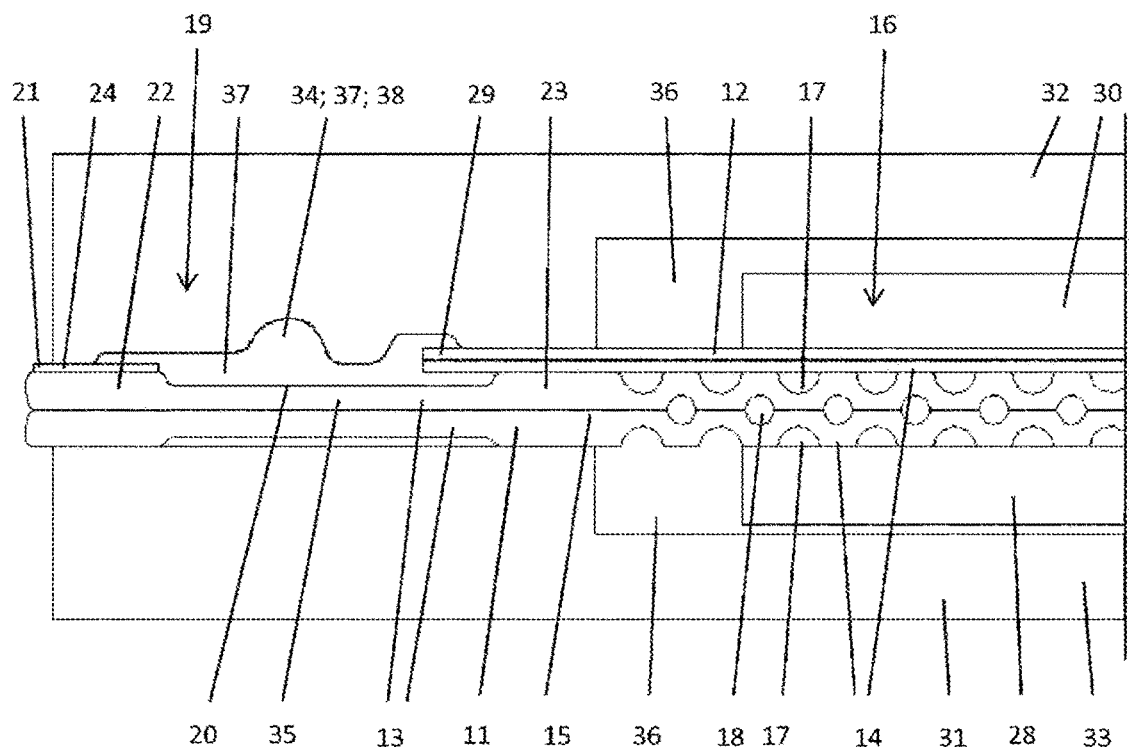
FIG. 7 is a laterally cut partial view of the arrangement of the bipolar plate with the MEA and the fixing elements as a unit in a second tool.

FIGS. 2 to 8 show a method for producing a composite 10 of a bipolar plate 11 and a membrane electrode assembly 12 for a fuel cell (not shown) or a fuel cell stack (not shown) in individual steps, wherein reference symbols differing from those of FIG. 1 relating to the prior art are used. FIG. 2 shows a bipolar plate 11 having two similar plates 13 for forming the bipolar plate 11. The two plates 13 of the bipolar plate 11 each have a cell side 14 and a cooling side 15, the cooling sides 15 of both plates 13 facing one another. The plates 13, i.e., the part of the plates 13 shown, are subdivided into an active region 16 in which the cell reaction takes place and through which therefore run channels 17 for the different reaction gases and channels 18 for a coolant, and an edge region 19 which has different functions and also serves to seal the individual fuel cells (not shown). The edge region 19 of the plates 13 is planar on the cooling side 15. A depression 20 is provided on the cell sides 14 of the plates 13 facing away from one another so that the part 22 of the edge region 19 lying on the plate edge 21 and the part 23 of the edge region 19 adjoining the active region have an identical level, with the depression 20 extending therebetween. The part 22 of the edge region 19 lying on the plate edge 21 is provided with a flat seal 24. As can be seen in FIG. 3, the bipolar plate 11 is inserted into a tool 25. For positioning the bipolar plate, the tool 25 has a stop 26 against which the bipolar plate 10 rests with its edge region 19. Apart from that, the tool 25 has a planar contact surface 27 for the bipolar plate 11. A ferromagnetic element 28 is introduced into the contact surface 26 in the region of the active region 16 of the bipolar plate 11 and is designed such that it can be raised orthogonally to the contact surface 27 and removed therefrom. In the fitted state of the ferromagnetic element 28, this is part of the contact surface 27. In the next step, as shown in FIG. 4, a membrane electrode assembly (MEA) 12 is placed onto the active region 16 of the bipolar plate 11, which extends from the active region 16 to the region of the depression 20 so that the end 29 of the MEA 12 is not supported. After the MEA 12 has been positioned on the bipolar plate 11, the MEA 12 and the bipolar plate 11 are fixed in such a way that they cannot be displaced relative to one another during the further method. For fixing, a magnetic element 30 is applied to the MEA 12, which element may be aligned congruently with the ferromagnetic element 28 in the contact surface 27 of the tool 25. As can be seen in FIG. 6, the MEA 12 fixed with the ferromagnetic element 28 and the magnetic element 30 to the bipolar plate 11 is removed from the tool 25 and placed in a second tool 31 (FIG. 7). In the illustrated embodiment of the method, the second tool 31 is an injection molding tool.

The second tool 31 consists of two assemblable halves 32, 33. The halves 32, 33 of the tool 31 have a defined structure in the contact area with the bipolar plate 11, which structure in the closed state of the second tool 31 leads to the formation of mold cavities 34, 35 on both sides of the edge region 19 of the bipolar plate 11.

Figure 8:
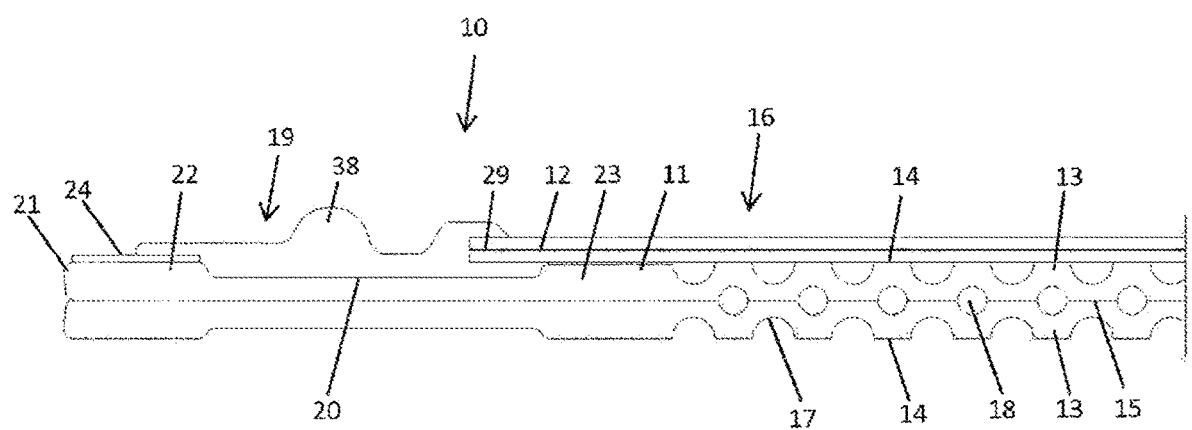
FIG. 8 is a laterally cut partial view of a composite of a bipolar plate and an MEA with two overlapping seals in the edge region of a plate of the bipolar plate.

Furthermore, the two halves 32, 33 of the second tool 31 hold the bipolar plate 11 and MEA 12 in a clamping manner. Furthermore, the two halves 31, 32 form a (second) chamber 36 in which, when the tool 31 is closed, the region of the bipolar plate 11 with the ferromagnetic element 28 and the magnetic element 30 is arranged. This chamber 36 does not serve as a mold cavity. In at least the mold cavity 34 of the tool 31 which is located on the cell side 14 of the bipolar plate 11 with the seal 24 already present, a sealing material 37 is introduced in the molten state. This sealing material 37 is consequently distributed in the mold cavity 34 of the tool 31 on the bipolar plate 11 and on or under the MEA 12, filling the depression 20 of the bipolar plate 11. In addition, the sealing material 37 spreads on a part of the surface of the flat seal 24. The sealing material 21 may be a polymer, in particular a thermoplastic, an elastomer or a thermoplastic elastomer, which furthermore has an elastic property in the hardened state. In principle, all materials which are already accessible to the person skilled in the art for sealing the cell side 13 of bipolar plates 11 can be used. After the sealing material 37 has hardened, a seal 38 with a profile is obtained. In a further method step, the composite 10 produced is removed from the bipolar plate 11 and MEA 12, wherein the ferromagnetic element 28 and the magnetic element 30 are removed only at this point in time, and can be used to construct a fuel cell stack. For this purpose, a plurality of the composites 11 are stacked one on top the other so that the seals 24, 38 in the edge region 19 each abut against a further bipolar plate 11 of a composite 10. The obtained composite 10 is shown in FIG. 8. The two seals 24, 38 are each arranged around the entire circumference of the bipolar plates 11 and prevent leakage of operating media when they are arranged in a fuel cell stack which is designed analogously to the fuel stack 100 in FIG. 1.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method for producing a composite of a bipolar plate and a membrane electrode assembly for a fuel cell or a fuel cell stack, wherein the bipolar plate comprises two opposite plates and each plate has a cell side and a cooling side, the method comprising:
    arranging the bipolar plate in a tool which has a first element which is either ferromagnetic or magnetic and which partially forms a contact surface for the bipolar plate and is designed to be removable from the tool;
    arranging a membrane electrode assembly on the side of the bipolar plate opposite the contact surface of the tool;
    arranging a second element which is either ferromagnetic or magnetic and which is designed to correspond to the first element in order to be able to exert a magnetic attraction on one another, on the membrane electrode assembly in such a way that both of the first and second elements are at least partially congruent;
    removing the membrane electrode assembly and the bipolar plate fixed to one another by the first and second elements;
    inserting the membrane electrode assembly and the bipolar plate fixed to one another by the first and second elements into a second tool which, in a closed state, has a mold cavity on one side or both sides of an edge region of the bipolar plate and a second chamber for receiving the first and second elements, the mold cavity and the second chamber being separated from one another;
    injecting a melt of a polymeric sealing material into the mold cavity of the tool;
    allowing the melt to solidify; and
    demolding and removing the composite.

2. The method according to claim 1, wherein the first and second elements are arranged congruently.

3. The method according to claim 1, wherein a peripheral seal is applied in the region of the plate edge of the bipolar plate before the inserting.

4. The method according to claim 3, wherein the bipolar plate has a peripheral edge region which has a likewise peripheral depression, the depression being arranged correspondingly to the mold cavity of the tool so that the sealing material fills the depression and covers one part of the non-recessed edge region on one or both sides of the depression.

5. The method according to claim 4, wherein the sealing material partially covers the peripheral seal.

6. The method according to claim 4, wherein the membrane electrode assembly is arranged in such a way that it partially covers the depression of the edge region.

7. The method according to claim 6, wherein the sealing material surrounds the membrane electrode assembly at least in the region of the depression.

8. The method according to claim 1, wherein the first tool has a stop for positioning the bipolar plate.

9. A composite of a bipolar plate and a membrane electrode assembly, the composite produced according to a method comprising:
    arranging the bipolar plate in a tool which has a first element which is either ferromagnetic or magnetic and which partially forms a contact surface for the bipolar plate and is designed to be removable from the tool;
    arranging a membrane electrode assembly on the side of the bipolar plate opposite the contact surface of the tool;
    arranging a second element which is either ferromagnetic or magnetic and which is designed to correspond to the first element in order to be able to exert a magnetic attraction on one another, on the membrane electrode assembly in such a way that both of the first and second elements are at least partially congruent;

removing the membrane electrode assembly and the bipolar plate fixed to one another by the first and second elements;

inserting the membrane electrode assembly and the bipolar plate fixed to one another by the first and second elements into a second tool which, in a closed state, has a mold cavity on one side or both sides of an edge region of the bipolar plate and a second chamber for receiving the first and second elements, the mold cavity and the second chamber being separated from one another;

injecting a melt of a polymeric sealing material into the mold cavity of the tool;

allowing the melt to solidify; and demolding and removing the composite.

10. A fuel cell stack comprising a plurality of composites, the composites each formed according to a method comprising:

arranging the bipolar plate in a tool which has a first element which is either ferromagnetic or magnetic and which partially forms a contact surface for the bipolar plate and is designed to be removable from the tool;

arranging a membrane electrode assembly on the side of the bipolar plate opposite the contact surface of the tool;

arranging a second element which is either ferromagnetic or magnetic and which is designed to correspond to the first element in order to be able to exert a magnetic attraction on one another, on the membrane electrode assembly in such a way that both of the first and second elements are at least partially congruent;

removing the membrane electrode assembly and the bipolar plate fixed to one another by the first and second elements;

inserting the membrane electrode assembly and the bipolar plate fixed to one another by the first and second elements into a second tool which, in a closed state, has a mold cavity on one side or both sides of an edge region of the bipolar plate and a second chamber for receiving the first and second elements, the mold cavity and the second chamber being separated from one another;

injecting a melt of a polymeric sealing material into the mold cavity of the tool;

allowing the melt to solidify; and demolding and removing the composite.

11. The method according to claim 1, further comprising removing the first and second elements from the composite.

* * * * *